United States Patent
Mikashima

(10) Patent No.: US 9,628,655 B2
(45) Date of Patent: Apr. 18, 2017

(54) IMAGE FORMING APPARATUS AND IMAGE FORMING METHOD THAT ARE NORMALLY RESETTABLE IN MODE WHERE OPERATING VOLTAGE IS NOT SUPPLIED TO MAIN CPU

(71) Applicant: KYOCERA Document Solutions Inc., Osaka (JP)

(72) Inventor: Katsuo Mikashima, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 15/141,341

(22) Filed: Apr. 28, 2016

(65) Prior Publication Data

US 2016/0337528 A1 Nov. 17, 2016

(30) Foreign Application Priority Data

May 11, 2015 (JP) ................................. 2015-096296

(51) Int. Cl.
*G06F 15/00* (2006.01)
*H04N 1/00* (2006.01)

(52) U.S. Cl.
CPC ............................ *H04N 1/00899* (2013.01)

(58) Field of Classification Search
USPC ............................................. 358/1.13–1.15
See application file for complete search history.

(56) References Cited

U.S. PATENT DOCUMENTS

| | | | | |
|---|---|---|---|---|
| 2011/0072317 A1* | 3/2011 | Adachi | ..................... | G06F 1/28 714/48 |
| 2014/0320885 A1* | 10/2014 | Kubo | ................. | G06K 15/4055 358/1.14 |

FOREIGN PATENT DOCUMENTS

JP 2005-148890 A 6/2005

* cited by examiner

*Primary Examiner* — Saeid Ebrahimi Dehkord
(74) *Attorney, Agent, or Firm* — Stein IP, LLC

(57) ABSTRACT

An image forming apparatus includes a main CPU, a sub CPU, a mode control circuit, a voltage monitoring circuit, a reset circuit, and a prevention circuit. The voltage monitoring circuit outputs a first abnormality detection signal if the operating voltage supplied to the main CPU is determined as abnormal. The voltage monitoring circuit outputs a second abnormality detection signal if the operating voltage supplied to the sub CPU is determined as abnormal. The reset circuit resets the main CPU and the sub CPU if at least one of the first abnormality detection signal and the second abnormality detection signal is transmitted. The prevention circuit prevents the transmission of the first abnormality detection signal to the reset circuit in the second mode.

4 Claims, 5 Drawing Sheets

IMAGE FORMING APPARATUS AND IMAGE FORMING METHOD THAT ARE NORMALLY RESETTABLE IN MODE WHERE OPERATING VOLTAGE IS NOT SUPPLIED TO MAIN CPU

INCORPORATION BY REFERENCE

This application is based upon, and claims the benefit of priority from, corresponding Japanese Patent Application No. 2015-096296 filed in the Japan Patent Office on May 11, 2015, the entire contents of which are incorporated herein by reference.

BACKGROUND

Unless otherwise indicated herein, the description in this section is not prior art to the claims in this application and is not admitted to be prior art by inclusion in this section.

While the typical main CPU has a high performance, its power consumption is large. Use of the main CPU for a job that does not require high performance leads to waste of power, therefore a system that includes the main CPU and a sub CPU has been practically used. While the sub CPU does not have a high performance, its power consumption is small. According to this system, the main CPU and the sub CPU are selectively used in accordance corresponding to a job.

If an abnormality occurs in an operating voltage that is supplied to the CPU (for example, drop of the operating voltage and instantaneous interruption of the operating voltage), which causes the CPU malfunctions, a reset unit resets the CPU. In the system that includes the main CPU and the sub CPU, there is provided a technique that resets both the main CPU and the sub CPU to secure a synchronicity of processes of both of them when the reset unit resets at least one of the main CPU and the sub CPU based on a command of the main CPU.

SUMMARY

An image forming apparatus according to one aspect of the disclosure includes a main CPU, a sub CPU, a mode control circuit, a voltage monitoring circuit, a reset circuit, and a prevention circuit. The main CPU controls the image forming apparatus. The sub CPU controls a predetermined function of the image forming apparatus. The sub CPU has a power consumption smaller than a power consumption of the main CPU. The mode control circuit controls switching between a first mode and a second mode. The first mode supplies the main CPU and the sub CPU with an operating voltage. The second mode supplies the sub CPU with the operating voltage without supplying the main CPU with the operating voltage. The voltage monitoring circuit outputs a first abnormality detection signal if the operating voltage supplied to the main CPU is determined as abnormal. The voltage monitoring circuit outputs a second abnormality detection signal if the operating voltage supplied to the sub CPU is determined as abnormal. The reset circuit resets the main CPU and the sub CPU if at least one of the first abnormality detection signal and the second abnormality detection signal is transmitted. The prevention circuit prevents the transmission of the first abnormality detection signal to the reset circuit in the second mode.

An image forming method according to another aspect of the disclosure includes: preparing a main CPU that controls the image forming apparatus, and a sub CPU that controls a predetermined function of the image forming apparatus, the sub CPU having a power consumption smaller than a power consumption of the main CPU; controlling switching between a first mode and a second mode, the first mode supplying the main CPU and the sub CPU with an operating voltage, the second mode supplying the sub CPU with the operating voltage without supplying the main CPU with the operating voltage; outputting a first abnormality detection signal if the operating voltage supplied to the main CPU is determined as abnormal, the outputting includes outputting a second abnormality detection signal if the operating voltage supplied to the sub CPU is determined as abnormal; resetting the main CPU and the sub CPU if at least one of the first abnormality detection signal and the second abnormality detection signal is transmitted; and preventing the transmission of the first abnormality detection signal to the resetting in the second mode.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
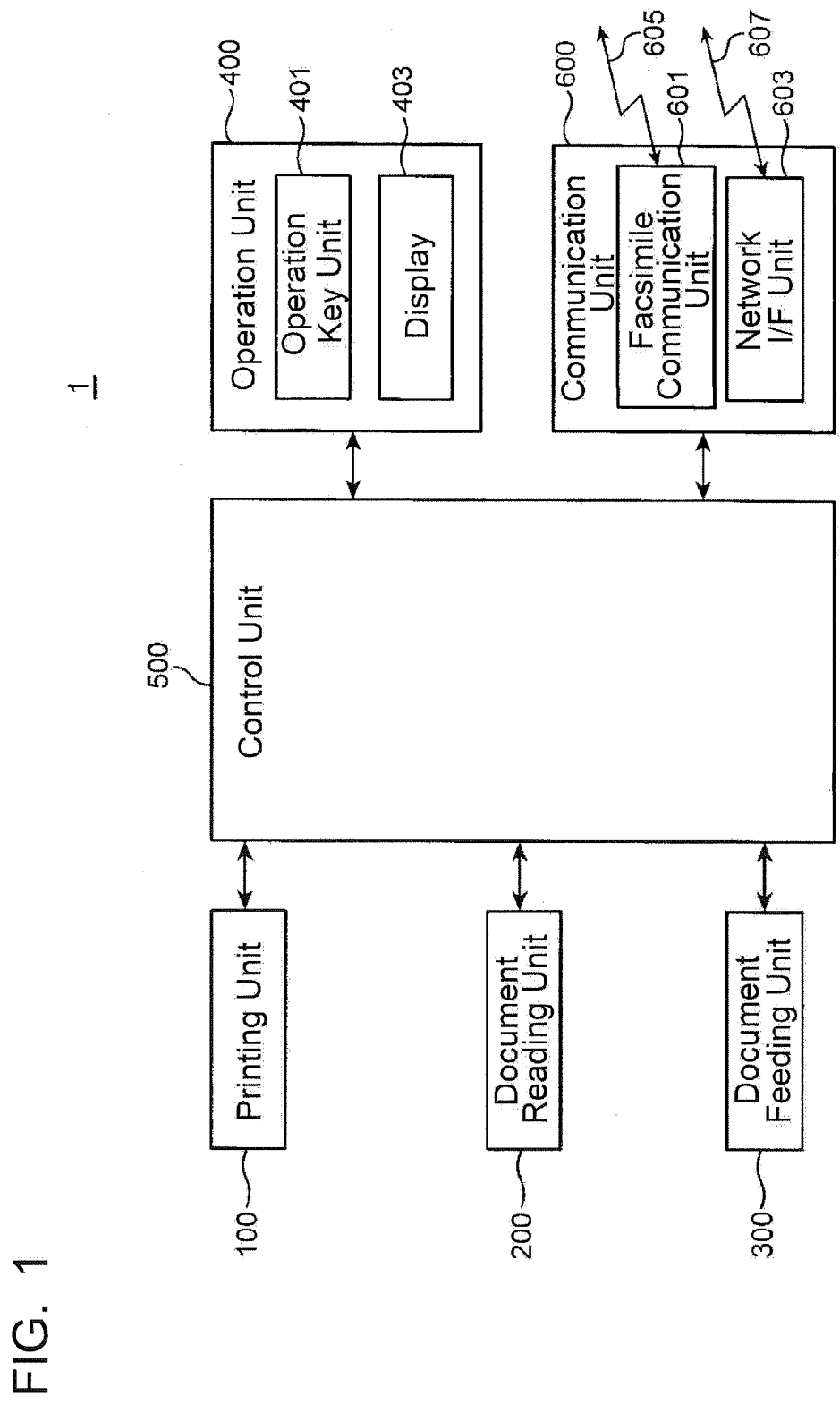
FIG. 1 illustrates a configuration of an image forming apparatus according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of the disclosure in detail based on the drawings. FIG. 1 illustrates a configuration of an image forming apparatus 1 according to the one embodiment of the disclosure. A digital multifunctional peripheral, which has functions of a copier, a printer, a scanner and a facsimile, will be described for an example as the image forming apparatus 1. The image forming apparatus 1 may be any apparatus as long as it has a function to print an image, and is not limited to the digital multi-functional peripheral. For example, a printer may be the image forming apparatus 1. The image forming apparatus 1 includes a printing unit 100, a document reading unit 200, a document feeding unit 300, an operation unit 400, a control unit 500 and a communication unit 600.

When one original document is placed on a document platen located on the document feeding unit 300, the document feeding unit 300 feeds the original document to the document reading unit 200, and when a plurality of original documents are placed on the document platen, the document feeding unit 300 feeds the plurality of the original documents continuously to the document reading unit 200.

The document reading unit 200 reads the original document placed on a platen and the original document fed from the document feeding unit 300, then outputs image data of the original document.

The printing unit 100 executes a print job. The print job is a job to generate a printed matter where an image represented by data (for example, image data output from the document reading unit 200, print data transmitted from a terminal device such as a PC and image data of a facsimile reception) is printed.

The operation unit 400 includes an operation key unit 401 and a display 403. The display 403 has a touch panel function and displays a screen including software keys. A user operates the software keys while watching the screen to configure settings required for executing a function such as copying.

The operation key unit 401 includes operation keys constituted of hardware keys. Examples of the operation keys include a start key, a numeric keypad, a reset key, and a function switching key which switches a copier, a printer, a scanner and a facsimile.

The control unit 500 includes a CPU, a ROM, and a RAM. The CPU executes a control required for operations of the image forming apparatus 1 with respect to the above-described components in the image forming apparatus 1 (for example, the printing unit 100). The ROM stores software required for controlling the operations of the image forming apparatus 1. The RAM is used, for example, to temporarily store data generated during an execution of software and to store application software.

The communication unit 600 includes a facsimile communication unit 601 and a network I/F unit 603. The facsimile communication unit 601 includes a Network Control Unit (NCU), which controls a telephone line connection with the other side of a facsimile, and a modulation-demodulation circuit, which modulates and demodulates signals for the facsimile communication. The facsimile communication unit 601 is connected to a telephone line 605.

The network I/F unit 603 is connected to a LAN 607. The network I/F unit 603 is a communication interface circuit for executing communication with a terminal device such as a PC connected to the LAN 607.

Figure 2:
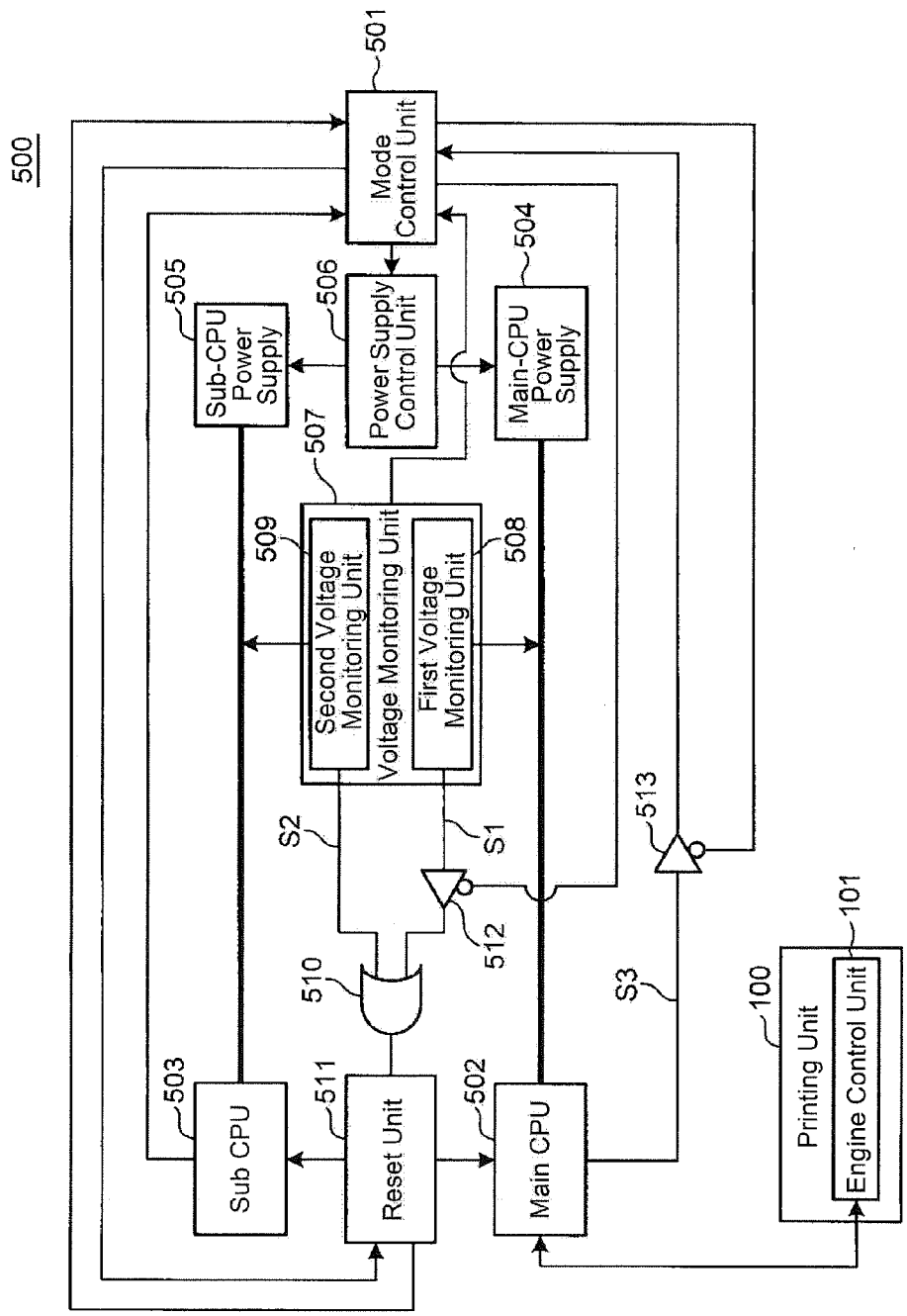
FIG. 2 illustrates a configuration of a control unit included in the image forming apparatus according to the one embodiment.

FIG. 2 illustrates a configuration of the control unit 500. The control unit 500 includes a mode control unit 501 (also referred to as a mode control circuit), a main CPU 502, a sub CPU 503, a main-CPU power supply 504, a sub-CPU power supply 505, a power supply control unit 506 (also referred to as a power supply control circuit), a voltage monitoring unit 507 (also referred to as a voltage monitoring circuit), an OR circuit 510, a reset unit 511 (also referred to as a reset circuit), a first mask circuit 512 and a second mask circuit 513. The main CPU 502 and the sub CPU 503 function as a main control unit. The mode control unit 501, the main-CPU power supply 504, the sub-CPU power supply 505, the power supply control unit 506, the voltage monitoring unit 507, the reset unit 511, the OR circuit 510, the first mask circuit 512 and the second mask circuit 513 function as a power-saving control unit.

The mode control unit 501 controls switching between a normal operation mode (a concrete example of a first mode) and a sleep mode (a concrete example of a second mode). The normal operation mode is a mode where the image forming apparatus 1 can operate normally. In the normal operation mode, the printing unit 100, the document reading unit 200, and the document feeding unit 300, which are illustrated in FIG. 1, operate; the operation unit 400 waits for key operations; and the communication unit 600 waits for a print job transmitted from outside. The sleep mode is a mode where the image forming apparatus 1 is in a power-saving state. In the sleep mode, the image forming apparatus 1 is in the minimum power state to maintain a communication with outside.

The main CPU 502 controls the whole image forming apparatus 1 in the normal operation mode. For example, the main CPU 502 performs various kinds of image processing (such as compression and expansion processing, segmentation and rotation processing, and color correction) on image data of an original document read by the document reading unit 200 illustrated in FIG. 1 and print data transmitted from outside via the LAN 607. The main CPU 502 transmits the data to an engine control unit 101 mounted in the printing unit 100. The engine control unit 101 controls constituents of the printing unit 100, which are not illustrated, such as a paper sheet conveying mechanism, an exposure device, a photoreceptor drum, a developing unit and a fixing unit. The engine control unit 101 forms an image represented by the data and prints the image formed.

The main CPU 502 outputs a switching signal S3 that indicates an instruction to switch from the normal operation mode to the sleep mode when a predetermined condition is satisfied. The predetermined condition includes: a case where a user operates the operation unit 400 illustrated in FIG. 1 to input an operation to switch to the sleep mode; and a case where a predetermined period of time has passed after the operation unit 400 is operated last. The switching signal S3 is transmitted to the mode control unit 501. The mode control unit 501 controls to switch from the normal operation mode to the sleep mode when the switching signal S3 is transmitted from the main CPU 502.

The sub CPU 503 controls a predetermined function of the image forming apparatus 1. For example, the sub CPU 503 controls: the function that the operation unit 400 illustrated in FIG. 1 waits for key operations, and the function for the communication unit 600 to wait for a print job transmitted from outside in the normal operation mode; and the function to stand by with the minimum power to maintain a communication with outside in the sleep mode. The sub CPU 503 consumes less power than the main CPU 502.

The main-CPU power supply 504 is a DC-DC converter that generates an operating voltage to operate the main CPU 502. The sub-CPU power supply 505 is a DC-DC converter that generates an operating voltage to operate the sub CPU 503. The operating voltage is also referred to as a power supply voltage.

The power supply control unit 506 controls the main-CPU power supply 504 and the sub-CPU power supply 505. The power supply control unit 506 controls the main-CPU power supply 504 and the sub-CPU power supply 505 in the normal operation mode. The power supply control unit 506 controls the main-CPU power supply 504 to supply the operating voltage to the main CPU 502. The power supply control unit 506 controls the sub-CPU power supply 505 to supply the operating voltage to the sub CPU 503. Since the power supply control unit 506 stops the main-CPU power supply 504 in the sleep mode, the operating voltage is not supplied to the main CPU 502. The power supply control unit 506 controls the sub-CPU power supply 505 in the sleep mode to supply the operating voltage to the sub CPU 503.

The voltage monitoring unit 507 includes a first voltage monitoring unit 508 and a second voltage monitoring unit 509. The first voltage monitoring unit 508 includes a voltage sensor (not illustrated) that measures the operating voltage supplied to the main CPU 502. When the voltage measured with this sensor reduces lower than a predetermined value, the first voltage monitoring unit 508 determines the operating voltage supplied to the main CPU 502 as abnormal and switches a signal output to the reset unit 511 from a non-active to an active. This active signal is a first abnormality detection signal S1.

The second voltage monitoring unit 509 includes a voltage sensor (not illustrated) that measures the operating voltage supplied to the sub CPU 503. When the voltage measured with this sensor reduces lower than a predetermined value, the second voltage monitoring unit 509 determines the operating voltage supplied to the sub CPU 503 as abnormal and switches a signal output to the reset unit 511 from a non-active to an active. This active signal is a second abnormality detection signal S2.

The signal output from the first voltage monitoring unit 508 (the non-active signal or the active signal) and the signal output from the second voltage monitoring unit 509 (the non-active signal or the active signal) are input to the OR circuit 510. The signal output from the OR circuit 510 is transmitted to the reset unit 511.

When the signal transmitted from the OR circuit 510 is the active signal, that is, when at least one of the first abnormality detection signal S1 and the second abnormality detection signal S2 is transmitted from the OR circuit 510, the reset unit 511 resets the main CPU 502 and the sub CPU 503.

The first mask circuit 512 functions as a prevention unit (also referred to as a prevention circuit). The prevention unit prevents the first abnormality detection signal S1 from being transmitted to the reset unit 511 in the sleep mode (the concrete example of the second mode). Since in the sleep mode, the main CPU 502 is not supplied with the operating voltage, as described above, the first voltage monitoring unit 508 constantly outputs the first abnormality detection signal S1. This may possibly prevent the reset unit 511 from functioning normally in the sleep mode. With the image forming apparatus 1 according to the embodiment, the first mask circuit 512 (the prevention unit) prevents the first abnormality detection signal S1 from being transmitted to the reset unit 511 in the sleep mode. Therefore, when an abnormality occurs in the operating voltage supplied to the main CPU 502 and the sub CPU 503 even in the mode where the main CPU 502 is not supplied with the operating voltage (the sleep mode), the reset unit 511, which resets these CPUs, can function normally.

The first mask circuit 512 will be described in detail. The mode control unit 501 sets the first mask circuit 512 to be in an ineffective state in the normal operation mode, and to be in an effective state in the sleep mode.

In the normal operation mode, since the main CPU 502 is supplied with the operating voltage, it is required for the first abnormality detection signal S1 to reach the reset unit 511 when the first voltage monitoring unit 508 determines the operating voltage supplied to the main CPU 502 as abnormal. Accordingly, the mode control unit 501 sets the first mask circuit 512 to be in the ineffective state, in the normal operation mode, to cause the first abnormality detection signal S1 to pass through the first mask circuit 512. Therefore, when the first voltage monitoring unit 508 outputs the first abnormality detection signal S1 (the active signal), the first abnormality detection signal S1 passes through the first mask circuit 512 and is transmitted to the reset unit 511 via the OR circuit 510.

In the sleep mode, since the main CPU 502 is not supplied with the operating voltage, the first voltage monitoring unit 508 constantly outputs the first abnormality detection signal S1. Accordingly, the mode control unit 501 sets the first mask circuit 512 to be in the effective state, in the sleep mode, to cause the first mask circuit 512 to cut off the first abnormality detection signal S1 and to transmit a signal indicating the operating voltage supplied to the main CPU 502 as normal (the non-active signal) to the reset unit 511 via the OR circuit 510. Therefore, even though the first voltage monitoring unit 508 outputs the first abnormality detection signal S1, the first abnormality detection signal S1 is not transmitted to the reset unit 511.

Thus, in the normal operation mode, the first mask circuit 512 causes the first abnormality detection signal S1 to pass through to be transmitted to the reset unit 511, and in the sleep mode, the first mask circuit 512 cuts off the first abnormality detection signal S1 and transmits the signal indicating the operating voltage supplied to the main CPU 502 as normal to the reset unit 511.

The second mask circuit 513 will be described. As described above, in the normal operation mode, when the main CPU 502 determines to switch to the sleep mode, the main CPU 502 transmits the switching signal S3 to the mode control unit 501. If an abnormality occurs in the operating voltage supplied to the main CPU 502, the main CPU 502 may afterwards transmit the switching signal S3 erroneously to the mode control unit 501. Therefore, the second mask circuit 513 is located.

In the normal operation mode, the mode control unit 501 sets the second mask circuit 513 to be in the ineffective state when the first voltage monitoring unit 508 determines the operating voltage supplied to the main CPU 502 as not abnormal, and the mode control unit 501 sets the second mask circuit 513 to be in the effective state when the first voltage monitoring unit 508 determines the operating voltage supplied to the main CPU 502 as abnormal.

In the state where the operating voltage supplied to the main CPU 502 is not abnormal, it is required for the switching signal S3 to reach the mode control unit 501 when the main CPU 502 outputs the switching signal S3. Therefore, when the operating voltage supplied to the main CPU 502 is not abnormal, the mode control unit 501 sets the second mask circuit 513 to be in the ineffective state to cause the switching signal S3 to pass through the second mask circuit 513. Accordingly, when the main CPU 502 outputs the switching signal S3, the switching signal S3 passes through the second mask circuit 513 to be transmitted to the mode control unit 501.

In the state where the operating voltage supplied to the main CPU 502 is abnormal, it is required for the switching signal S3 not to reach the mode control unit 501 when the main CPU 502 outputs the switching signal S3. Therefore, when the operating voltage supplied to the main CPU 502 is abnormal, the mode control unit 501 sets the second mask circuit 513 to be in the effective state to cause the second mask circuit 513 to cut off the switching signal S3. Accordingly, when the main CPU 502 outputs the switching signal S3, the switching signal S3 is not transmitted to the mode control unit 501.

Thus, in the normal operation mode, the second mask circuit 513: causes the switching signal S3 to pass through to be transmitted to the mode control unit 501 when the voltage monitoring unit 507 determines the operating voltage supplied to the main CPU 502 as not abnormal; and cuts off the switching signal S3 so as not to be transmitted to the mode control unit 501 when the voltage monitoring unit 507 determines the operating voltage supplied to the main CPU 502 as abnormal.

Therefore, with the embodiment, when an abnormality occurs in the operating voltage supplied to the main CPU 502 in the normal operation mode, resetting of the main CPU 502 takes priority and the second mask circuit 513 prevents switching from the normal operation mode to the sleep mode by cutting off the switching signal S3.

Figure 3:
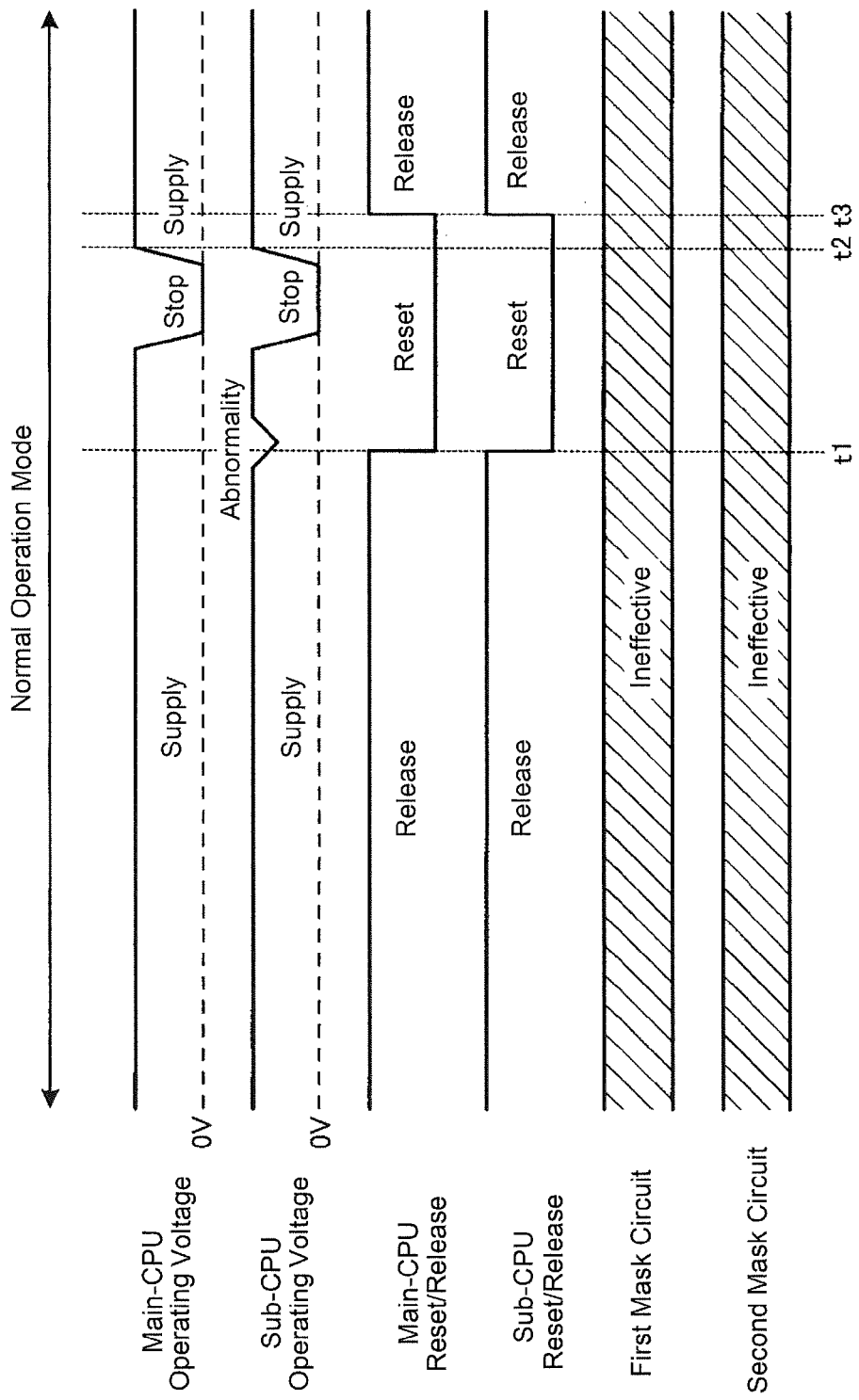
FIG. 3 illustrates a time chart when an abnormality occurs in an operating voltage that is supplied to a sub CPU in a state where the image forming apparatus according to the one embodiment is in a normal operation mode.

FIG. 3 illustrates a time chart when an abnormality occurs in the operating voltage that is supplied to the sub CPU 503 in a state where the image forming apparatus 1 is in the normal operation mode. The voltage monitoring unit 507 determines that an abnormality occurs in the operating voltage supplied to the sub CPU 503 at time t1.

With reference to FIG. 2 and FIG. 3, the operating voltage is supplied to the main CPU 502 and the sub CPU 503 normally until the time t1. Thus, the reset unit 511 releases resets of the main CPU 502 and the sub CPU 503 until the time t1.

Since the voltage monitoring unit 507 determines that an abnormality occurs in the operating voltage supplied to the sub CPU 503 (drop of the operating voltage) at the time t1, accordingly, the voltage monitoring unit 507 outputs the second abnormality detection signal S2. The second abnormality detection signal S2 is transmitted to the reset unit 511 after passing through the OR circuit 510. The reset unit 511 resets the main CPU 502 and the sub CPU 503.

The power supply control unit 506 controls the main-CPU power supply 504 and the sub-CPU power supply 505 so as to stop the main-CPU power supply 504 and the sub-CPU power supply 505 from supplying the operating voltage to the main CPU 502 and the sub CPU 503 after the resets of the main CPU 502 and the sub CPU 503 are started. The power supply control unit 506 controls the main-CPU power supply 504 and the sub-CPU power supply 505 so as to cause the main-CPU power supply 504 and the sub-CPU power supply 505 to resume supplying the operating voltage to the main CPU 502 and the sub CPU 503 at time t2 when a predetermined period of time has passed after the supply stops.

The reset unit 511 releases the resets of the main CPU 502 and the sub CPU 503 at time t3, which is later than the time t2. Thus, when the reset unit 511 resets the main CPU 502 and the sub CPU 503 in the normal operation mode, the reset unit 511 releases the resets of the main CPU 502 and the sub CPU 503 after a predetermined period of time has passed after the resets are started (a first period of time).

The first mask circuit 512 is in the ineffective state through the entire period of a time chart illustrated in FIG. 3 because the image forming apparatus 1 is in a state of the normal operation mode. That is, if an abnormality occurs in the operating voltage supplied to the main CPU 502, and the voltage monitoring unit 507 outputs the first abnormality detection signal S1, the first abnormality detection signal S1 is transmitted to the reset unit 511 passing through the first mask circuit 512.

The second mask circuit 513 is in the ineffective state through the entire period of the time chart illustrated in FIG. 3 because no abnormality occurs in the operating voltage supplied to the main CPU 502. That is, if the main CPU 502 outputs the switching signal S3, the switching signal S3 is transmitted to the mode control unit 501 passing through the second mask circuit 513.

Figure 4:
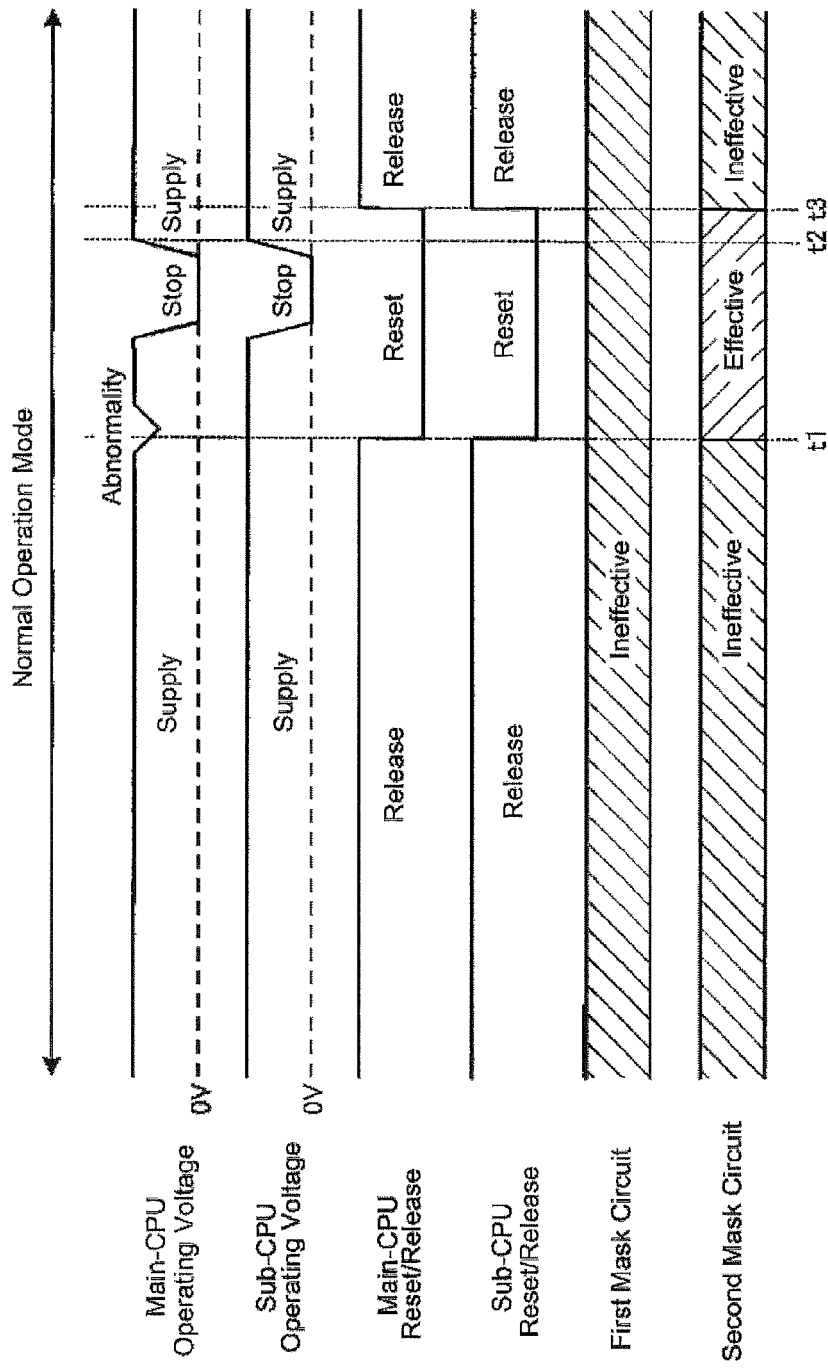
FIG. 4 illustrates a time chart when an abnormality occurs in an operating voltage that is supplied to a main CPU in a state where the image forming apparatus according to the one embodiment is in the normal operation mode.

FIG. 4 illustrates a time chart when an abnormality occurs in the operating voltage that is supplied to the main CPU 502 in a state where the image forming apparatus 1 is in the normal operation mode. Assume that the voltage monitoring unit 507 determines that an abnormality occurs in the operating voltage supplied to the main CPU 502 at time t1.

With reference to FIG. 2 and FIG. 4, the operating voltage is supplied to the main CPU 502 and the sub CPU 503 normally until the time t1. Thus, the reset unit 511 releases resets of the main CPU 502 and the sub CPU 503 until the time t1.

Since the voltage monitoring unit 507 determines that an abnormality occurs in the operating voltage supplied to the main CPU 502 (drop of the operating voltage) at the time t1, the voltage monitoring unit 507 outputs the first abnormality detection signal S1. The first abnormality detection signal S1 is transmitted to the reset unit 511 after passing through the OR circuit 510. The reset unit 511 resets the main CPU 502 and the sub CPU 503.

The voltage monitoring unit 507 notifies the occurrence of an abnormality in the operating voltage supplied to the main CPU 502 to the mode control unit 501. The mode control unit 501 controls the second mask circuit 513 to switch the second mask circuit 513 from the ineffective state to the effective state. This causes the second mask circuit 513 to cut off the switching signal S3 so as not to be transmitted to the mode control unit 501 even when the main CPU 502 outputs the switching signal S3.

The power supply control unit 506 controls the main-CPU power supply 504 and the sub-CPU power supply 505 so as to stop the main-CPU power supply 504 and the sub-CPU power supply 505 from supplying the operating voltage to the main CPU 502 and the sub CPU 503 after the resets of the main CPU 502 and the sub CPU 503 are started. The power supply control unit 506 controls the main-CPU power supply 504 and the sub-CPU power supply 505 so as to cause the main-CPU power supply 504 and the sub-CPU power supply 505 to resume supplying the operating voltage to the main CPU 502 and the sub CPU 503 at time t2 when a predetermined period of time has passed after the supply stops.

The reset unit 511 releases the resets of the main CPU 502 and the sub CPU 503 at time t3, which is later than the time t2. The reset unit 511 notifies the mode control unit 501 that rebooting the main CPU 502 and the sub CPU 503 is completed at the time t3. This causes the mode control unit 501 to control the second mask circuit 513 to switch the second mask circuit 513 from the effective state to the ineffective state.

The first mask circuit 512 is in the ineffective state through the entire period of a time chart illustrated in FIG. 4 because the image forming apparatus 1 is in a state of the normal operation mode.

Figure 5:
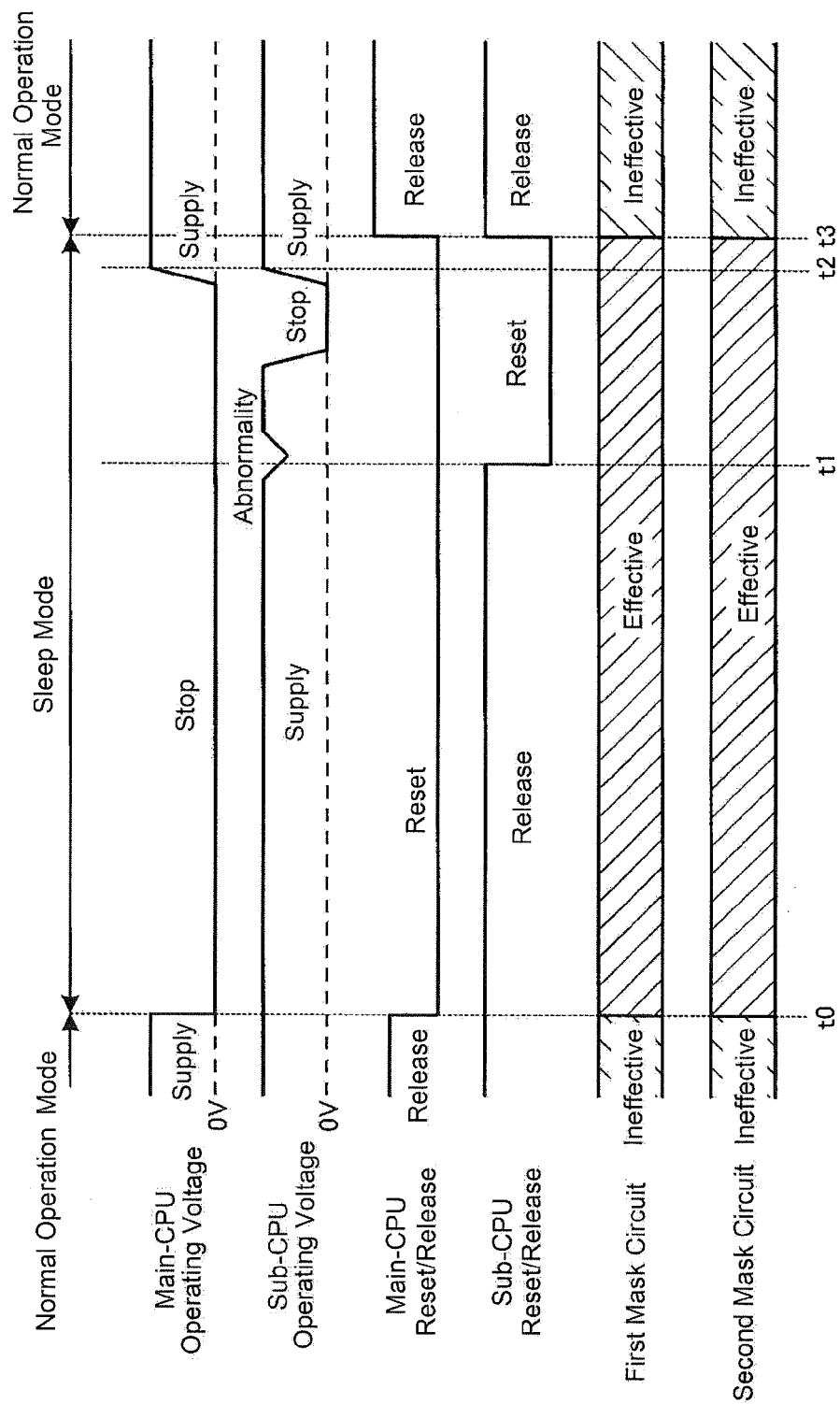
FIG. 5 illustrates a time chart when an abnormality occurs in an operating voltage that is supplied to the sub CPU in a state where the image forming apparatus according to the one embodiment is in a sleep mode.

FIG. 5 illustrates a time chart when an abnormality occurs in the operating voltage that is supplied to the sub CPU 503 in a state where the image forming apparatus 1 is in the sleep mode. Assume that the voltage monitoring unit 507 determines that an abnormality occurs in the operating voltage supplied to the sub CPU 503 at time t1.

With reference to FIG. 2 and FIG. 5, when the main CPU 502 determines to switch from the normal operation mode to the sleep mode, the main CPU 502 outputs the switching signal S3. The switching signal S3 is transmitted to the mode control unit 501, and the mode control unit 501 controls to switch from the normal operation mode to the sleep mode (time t0).

In detail, the mode control unit 501 controls the first mask circuit 512 and the second mask circuit 513 to switch each of them from the ineffective state to the effective state. After this, even if the voltage monitoring unit 507 outputs the first abnormality detection signal S1, the first mask circuit 512 cuts off the first abnormality detection signal S1 so as not to be transmitted to the reset unit 511. Similarly, even if the main CPU 502 outputs the switching signal S3, the second mask circuit 513 cuts off the switching signal S3 so as not to be transmitted to the mode control unit 501.

The mode control unit 501 notifies the power supply control unit 506, after setting the first mask circuit 512 and the second mask circuit 513 to be in the effective state, to stop supplying the operating voltage to the main CPU 502. The power supply control unit 506 controls the main-CPU power supply 504 so as to stop the main-CPU power supply 504 from supplying the operating voltage to the main CPU 502. The mode control unit 501 notifies the reset unit 511 to reset the main CPU 502. The reset unit 511 resets the main CPU 502.

The operating voltage is supplied to the sub CPU 503 from the time t0 to the time t1 normally. Thus, the reset unit 511 releases the reset of the sub CPU 503 until the time t1.

Since the voltage monitoring unit 507 determines that an abnormality occurs in the operating voltage supplied to the sub CPU 503 (drop of the operating voltage) at the time t1, the voltage monitoring unit 507 outputs the second abnormality detection signal S2. The second abnormality detection signal S2 is transmitted to the reset unit 511 after passing through the OR circuit 510. The reset unit 511 resets the sub CPU 503.

The power supply control unit 506 controls the sub-CPU power supply 505 so as to stop the sub-CPU power supply 505 from supplying the operating voltage to the sub CPU 503 after the reset of the sub CPU 503 is started. The power supply control unit 506 controls the main-CPU power supply 504 and the sub-CPU power supply 505 so as to cause the main-CPU power supply 504 and the sub-CPU power supply 505 to resume supplying the operating voltage to the main CPU 502 and the sub CPU 503 at time t2 when a predetermined period of time has passed after the supply stops.

The reset unit 511 releases the reset of the main CPU 502 and the sub CPU 503 at the time t3, which is later than the time t2. Thus, when the sub CPU 503 is reset while the main CPU 502 is not supplied with the operating voltage and the main CPU 502 is reset in the sleep mode, the reset unit 511 releases the resets of the main CPU 502 and the sub CPU 503 after a predetermined period of time has passed after the resets are started (a second predetermined period of time). This switches the mode from the sleep mode to the normal operation mode.

Since the mode switches to the normal operation mode, the mode control unit 501 controls the first mask circuit 512 and the second mask circuit 513 to switch each of them from the effective state to the ineffective state.

As illustrated in FIG. 3 and FIG. 4, assume that a period of time while the main CPU 502 and the sub CPU 503 are being reset in the normal operation mode is the first predetermined period of time. As illustrated in FIG. 5, assume that a period of time while the sub CPU 503 is being reset in the sleep mode is the second predetermined period of time. The lengths of these periods may be equal and may be different.

The normal operation of the main CPU 502 and the sub CPU 503 may not recover only by resetting the main CPU 502 and the sub CPU 503 by the reset unit 511 when an abnormality occurs in the operating voltage supplied to the main CPU 502 and the sub CPU 503. For example, it occurs that the main CPU 502 and the sub CPU 503 cannot recover from the sleep mode to the normal operation mode.

With the embodiment, with reference to FIG. 3 and FIG. 4, when an abnormality occurs in the operating voltage supplied to the main CPU 502 or the sub CPU 503 in the normal operation mode, the power supply control unit 506 temporarily stops supplying the operating voltage to the main CPU 502 and the sub CPU 503 during the first predetermined period of time (during the period of time from the time t1 to the time t2) in addition to resetting the main CPU 502 and the sub CPU 503 by the reset unit 511, and then, the power supply control unit 506 controls to resume supplying the operating voltage to the main CPU 502 and the sub CPU 503 (that is, to reboot the main CPU 502 and the sub CPU 503).

With reference to FIG. 5, when an abnormality occurs in the operating voltage supplied to the sub CPU 503 in the sleep mode, the power supply control unit 506 temporarily stops supplying the operating voltage to the sub CPU 503 during the second predetermined period of time (during the period of time from the time t1 to the time t2) in addition to resetting the sub CPU 503 by the reset unit 511, and then, the power supply control unit 506 controls to resume supplying the operating voltage to the main CPU 502 and the sub CPU 503 (that is, to reboot the main CPU 502 and the sub CPU 503).

As described above, with the embodiment, when an abnormality occurs in the operating voltage supplied to the main CPU 502 and the sub CPU 503, and the main CPU 502 and the sub CPU 503 are reset, the main CPU 502 and the sub CPU 503 are rebooted so as to recover the normal operation of the main CPU 502 and the sub CPU 503.

Instead of the first mask circuit 512 functioning as the prevention unit, the following aspect may be employed. The prevention unit controls the first voltage monitoring unit 508 in the sleep mode. This causes the first voltage monitoring unit 508 to stop monitoring whether or not the operating voltage supplied to the main CPU 502 is abnormal and to transmit the signal indicating the operating voltage supplied to the main CPU 502 as normal (the non-active signal) to the reset unit 511.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus, comprising:
    a main CPU that controls the image forming apparatus;
    a sub CPU that controls a predetermined function of the image forming apparatus, the sub CPU having a power consumption smaller than a power consumption of the main CPU;
    a mode control circuit that controls switching between a first mode and a second mode, the first mode supplying the main CPU and the sub CPU with an operating voltage, the second mode supplying the sub CPU with the operating voltage without supplying the main CPU with the operating voltage;
a voltage monitoring circuit that outputs a first abnormality detection signal if the operating voltage supplied to the main CPU is determined as abnormal, the voltage monitoring circuit outputting a second abnormality detection signal if the operating voltage supplied to the sub CPU is determined as abnormal;
a reset circuit that resets the main CPU and the sub CPU if at least one of the first abnormality detection signal and the second abnormality detection signal is transmitted; and
a prevention circuit that prevents the transmission of the first abnormality detection signal to the reset circuit in the second mode,
wherein the prevention circuit includes a first mask circuit that causes the first abnormality detection signal to pass through the first mask circuit and to be transmitted to the reset circuit in the first mode, the first mask circuit cutting off the first abnormality detection signal and transmitting a signal indicating that the operating voltage supplied to the main CPU is normal, to the reset circuit in the second mode.

2. The image forming apparatus according to claim 1, wherein the prevention circuit controls the voltage monitoring circuit, in the second mode, to cause the voltage monitoring circuit to stop monitoring whether or not the operating voltage supplied to the main CPU is abnormal, and to transmit a signal indicating the operating voltage supplied to the main CPU is normal to the reset circuit.

3. An image forming apparatus, comprising:
a main CPU that controls the image forming apparatus;
a sub CPU that controls a predetermined function of the image forming apparatus, the sub CPU having a power consumption smaller than a power consumption of the main CPU;
a mode control circuit that controls switching between a first mode and a second mode, the first mode supplying the main CPU and the sub CPU with an operating voltage, the second mode supplying the sub CPU with the operating voltage without supplying the main CPU with the operating voltage;
a voltage monitoring circuit that outputs a first abnormality detection signal if the operating voltage supplied to the main CPU is determined as abnormal, the voltage monitoring circuit outputting a second abnormality detection signal if the operating voltage supplied to the sub CPU is determined as abnormal;
a reset circuit that resets the main CPU and the sub CPU if at least one of the first abnormality detection signal and the second abnormality detection signal is transmitted;
a prevention circuit that prevents the transmission of the first abnormality detection signal to the reset circuit in the second mode,
wherein when the main CPU and the sub CPU are reset in the first mode, the reset circuit releases the resets of the main CPU and the sub CPU after a lapse of a first predetermined period of time since the resets are started,
when the sub CPU is reset while the main CPU is not supplied with the operating voltage and the main CPU is reset in the second mode, the reset circuit releases the resets of the main CPU and the sub CPU after a lapse of a second predetermined period of time since the resets are started;
wherein the image forming apparatus further includes a power supply control circuit,
the power supply control circuit stops supplying the operating voltage to the main CPU and the sub CPU after the resets of the main CPU and the sub CPU are started, and resumes supplying the operating voltage to the main CPU and the sub CPU before the resets of the main CPU and the sub CPU are released in the first mode, and
the power supply control circuit stops supplying the operating voltage to the sub CPU after the reset of the sub CPU is started, and resumes supplying the operating voltage to the main CPU and the sub CPU before the resets of the main CPU and the sub CPU are released in the second mode.

4. An image forming apparatus, comprising:
a main CPU that controls the image forming apparatus;
a sub CPU that controls a predetermined function of the image forming apparatus, the sub CPU having a power consumption smaller than a power consumption of the main CPU;
a mode control circuit that controls switching between a first mode and a second mode, the first mode supplying the main CPU and the sub CPU with an operating voltage, the second mode supplying the sub CPU with the operating voltage without supplying the main CPU with the operating voltage;
a voltage monitoring circuit that outputs a first abnormality detection signal if the operating voltage supplied to the main CPU is determined as abnormal, the voltage monitoring circuit outputting a second abnormality detection signal if the operating voltage supplied to the sub CPU is determined as abnormal;
a reset circuit that resets the main CPU and the sub CPU if at least one of the first abnormality detection signal and the second abnormality detection signal is transmitted;
a prevention circuit that prevents the transmission of the first abnormality detection signal to the reset circuit in the second mode,
wherein the mode control circuit controls to switch from the first mode to the second mode when a switching signal indicating an instruction for switching from the first mode to the second mode is transmitted from the main CPU,
wherein the image forming apparatus further includes a second mask circuit,
the second mask circuit causes the switching signal to pass through the second mask circuit and causes the switching signal to be transmitted to the mode control circuit when the voltage monitoring circuit determines the operating voltage supplied to the main CPU is not abnormal in the first mode, and
the second mask circuit cuts off the switching signal not to be transmitted to the mode control circuit when the voltage monitoring circuit determines the operating voltage supplied to the main CPU is abnormal in the first mode.

* * * * *